United States Patent
Röhlich et al.

(10) Patent No.: US 12,359,283 B2
(45) Date of Patent: Jul. 15, 2025

(54) METHOD FOR THE PRODUCTION OF A COLLECTOR ALLOY COMPRISING PRECIOUS METAL OR OF PURE SILVER

(71) Applicant: Heraeus Deutschland Gmbh & Co. KG, Hanau (DE)

(72) Inventors: Christoph Röhlich, Hanau (DE); Bernhard Bauer-Siebenlist, Hanau (DE); Holger Winkler, Hanau (DE); Karl Bernhard Friedrich, Aachen (DE); Diana Caroline Vieten, Aachen (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 531 days.

(21) Appl. No.: 17/904,172

(22) PCT Filed: Dec. 21, 2020

(86) PCT No.: PCT/EP2020/087403
§ 371 (c)(1),
(2) Date: Aug. 12, 2022

(87) PCT Pub. No.: WO2021/164931
PCT Pub. Date: Aug. 26, 2021

(65) Prior Publication Data
US 2023/0078641 A1 Mar. 16, 2023

(30) Foreign Application Priority Data
Feb. 18, 2020 (EP) .................... 20157810

(51) Int. Cl.
| C22B 11/02 | (2006.01) |
| C22B 11/00 | (2006.01) |
| C22C 1/02 | (2006.01) |
| C22C 9/00 | (2006.01) |

(52) U.S. Cl.
CPC ............. C22C 9/00 (2013.01); C22B 11/00 (2013.01); C22B 11/021 (2013.01); C22C 1/02 (2013.01)

(58) Field of Classification Search
CPC .................................... C22B 11/021
See application file for complete search history.

(56) References Cited

U.S. PATENT DOCUMENTS

| 4,135,912 A | 1/1979 | Matthew et al. |
| 4,427,442 A | 1/1984 | Day |
| 2006/0213323 A1 | 9/2006 | Yamada et al. |
| 2014/0026713 A1* | 1/2014 | Bezuidenhout ........... B22F 9/08 75/631 |

FOREIGN PATENT DOCUMENTS

| CN | 108588429 A | 9/2018 |
| CN | 110777259 A | 2/2020 |
| DE | 3203826 A1 | 9/1982 |
| DE | 3816697 C1 | 4/1989 |
| EP | 1607488 A1 | 12/2005 |
| EP | 2666876 A1 | 11/2013 |
| JP | 2004277792 A | 10/2004 |

OTHER PUBLICATIONS

Dong Haigang et al., "Recovery of platinum group metals from spent catalysts: A review", International Journal of Mineral Processing, vol. 145, Jun. 7, 2015 (Jun. 7, 2015), pp. 108-113 DOI: 10.1016/J.MINPRO.2015.06.009 ISSN: 0301-7516, XP029313833; the whole document.

Peng, Zhiwei et al, Pyrometallurgical Recovery of Platinum Group Metals from Spent Catalysts, JOM: Journal of Metals, vol. 69, No. 9, pp. 1553-1562, Jul. 10, 2017.

Han, Yun Soon et al, Thermodynamics of Gold dissolution Behavior in CaO—SiO2—Al2O3—MgOsat Slag System, Metallurgical and Materials Transaction B, vol. 46B, pp. 2449-2457, Dec. 2015.

* cited by examiner

*Primary Examiner* — Christopher S Kessler
(74) *Attorney, Agent, or Firm* — Blank Rome LLP

(57) ABSTRACT

A method for producing a collector alloy comprising 25 to 100 wt % precious metal in total, comprising 0 to <97 wt % of the precious metal silver, 0 to 75 wt % of at least one precious metal selected from gold, platinum, rhodium and palladium, and 0 to 75 wt % of at least one non-precious metal selected from copper, iron, tin and nickel, or for producing pure silver, comprising the steps of:
(1) providing precious metal sweeps;
(2) providing a flux which, during collective melting with the refractory inorganic material from the precious metal sweeps provided in step (1);
(3) collective melting of the materials provided in steps (1) and (2) at a temperature in the range of from 1300 to 1600° C., forming a melt comprising at least two phases of different densities arranged one above the other; and,
(4) separating the upper phase and the lower phase.

11 Claims, No Drawings

METHOD FOR THE PRODUCTION OF A COLLECTOR ALLOY COMPRISING PRECIOUS METAL OR OF PURE SILVER

The invention relates to a method for the production of a collector alloy comprising precious metal or of pure silver.

The term "precious metal" as used herein generally comprises the elements silver (Ag), gold (Au), platinum (Pt), palladium (Pd), rhodium (Rh), osmium (Os), iridium (Ir), ruthenium (Ru) and rhenium (Re).

The term "pure silver" used herein refers to silver having a purity of at least 97 wt % (% by weight) and is thus distinct from alloys with a silver content of <97 wt %.

The production of collector alloys comprising precious metal from precious metal-containing waste by means of melting metallurgy methods is known. This results in a collector alloy comprising precious metal on the one hand and a slag on the other hand, cf. for example DE 38 16 697 C1 and DE 32 03 826 A1. In this case, however, it is still possible for the slag to comprise significant precious metal fractions which, from an economic point of view, but also for reasons of resource conservation, prohibit slag from being discarded and can require more or less elaborate further processing of the slag.

It was an object of the present invention to develop a melting metallurgy method for processing certain precious metal sweeps with the lowest possible losses of precious metal into the slag.

The term "precious metal sweeps" as used herein (also known as "precious metal dross") means precious metal-containing residues, in particular consolidated goods (residues, dusts, abrasive dusts, polishing dusts) from precious metal processing (jewelry industry, jewelry workshops, dental waste), but also, for example, residues from ore preparation, precipitation residues and ashes. Precious metal sweeps that comprise silver as the sole precious metal are silver sweeps.

The present invention solves the problem by providing a method either for producing a collector alloy comprising 25 to 100 wt % precious metal in total (hereinafter also simply referred to as "collector alloy" for brevity), comprising 0 to <97 wt % of the precious metal silver, 0 to 75 wt % of at least one precious metal selected from the group consisting of gold, platinum, rhodium and palladium, and 0 to 75 wt % of at least one non-precious metal selected from the group consisting of copper, iron, tin and nickel, or for producing pure silver. The method comprises the steps of:
(1) providing precious metal sweeps comprising 4 to 30 wt % precious metal in total, comprising or consisting of 0 to 30 wt % of the precious metal silver, 0 to 10 wt % of at least one precious metal selected from the group consisting of gold, platinum, rhodium and palladium, 0 to 10 wt % of at least one non-precious metal selected from the group consisting of copper, iron, tin and nickel, and 70 to 96 wt % of at least one refractory inorganic material,
(2) providing a flux which, during collective melting with the refractory inorganic material from the precious metal sweeps provided in step (1), is capable of forming a molten slag consisting of >35 to 45 wt % calcium oxide, 35 to 45 wt % silicon dioxide, 15 to <20 wt % aluminum oxide, and 0 to <15 wt % of one or more refractory inorganic compounds other than calcium oxide, silicon dioxide and aluminum oxide,
(3) collective melting of the materials provided in steps (1) and (2) at a temperature in the range of from 1300 to 1600° C., forming a melt comprising at least two phases of different densities arranged one above the other, and
(4) separating the low-density upper phase and the high-density lower phase,
wherein the upper phase comprises or is a slag phase consisting of >35 to 45 wt % calcium oxide, 35 to 45 wt % silicon dioxide, 15 to <20 wt % aluminum oxide, and 0 to <15 wt % of one or more refractory inorganic compounds other than calcium oxide, silicon dioxide and aluminum oxide, and the lower phase comprises or is the collector alloy or pure silver, wherein none of the materials used in the method comprises copper oxide (CuO and/or $Cu_2O$), except for copper oxide optionally present as an outer copper oxide layer on metallic copper.

None of the materials used in the method according to the invention comprises copper oxide in bulk. In this specific context, the word "used" employed in "materials used" comprises actions such as "provided, supplied, added". "Copper oxide optionally present as an outer copper oxide layer on metallic copper" refers to the case, which is only possible in the first embodiment of the method according to the invention, that metallic copper is present as a constituent in the precious metal sweeps provided in step (1) and/or is used as such in the method as an additive, wherein the metallic copper optionally has an outer copper oxide layer. In the second embodiment of the method according to the invention, no metallic copper is present as a constituent in the silver sweeps provided in step (1), and metallic copper is also not used as an additive at any point in the method.

The terms "refractory inorganic material" and "refractory inorganic compounds" are used herein. A refractory inorganic material is a non-metallic material which is resistant to high temperatures, for example in the range of from 900 to 2500° C., i.e. material which is physically and chemically non-changing or virtually non-changing, or thermally decomposable precursors of such resistant materials, such as, for example, sulfates or carbonates. It can, for example, be ceramic refractory material. Examples of refractory inorganic materials include inorganic compounds such as, for example, oxides, hydroxides and oxide hydrates of the elements aluminum, titanium, silicon, magnesium, tin, zinc, zirconium, iron, nickel and calcium; silicates, aluminosilicates, titanates and other mixed oxides; calcium carbonate; sodium carbonate; calcium sulfate; barium sulfate; calcium phosphate; silicon carbide and silicon nitride. The refractory inorganic materials as such are intrinsically precious metal-free. The refractory inorganic materials or refractory inorganic compounds used or added in the method according to the invention do not comprise copper oxide; this also applies in particular with a view to the refractory inorganic materials or compounds comprised as a constituent of materials (sweeps and flux) provided in method steps (1) and (2).

The term "precious metal-free" used herein is understood by the person skilled in the art as precious metal-free except for a low precious metal content, for example in the range of from >0 to 25 ppm by weight, which is technically practically unavoidable for a relevant material.

The method according to the invention takes place in particular within the scope of a melting metallurgy method for processing precious metal sweeps or silver sweeps. "Melting metallurgy processing" refers here to the recovery of precious metal or silver by melting metallurgy. Alternatively, the invention can therefore also be understood as a method comprising steps (1) through (4) for melting metallurgy processing of the precious metal sweeps comprising 4 to 30 wt % precious metal in total.

In a first embodiment, it is a method for producing a collector alloy comprising 25 to 100 wt % precious metal in total, comprising 0 to <97 wt % of the precious metal silver, 0 to 75 wt % of at least one precious metal selected from the group consisting of gold, platinum, rhodium and palladium, and 0 to 75 wt % of at least one non-precious metal selected from the group consisting of copper, iron, tin and nickel, comprising the steps of:

(1) providing precious metal sweeps comprising 4 to 30 wt % precious metal in total, comprising or consisting of 0 to 30 wt % of the precious metal silver, 0 to 10 wt % of at least one precious metal selected from the group consisting of gold, platinum, rhodium and palladium, 0 to 10 wt % of at least one non-precious metal selected from the group consisting of copper, iron, tin and nickel, and 70 to 96 wt % of at least one refractory inorganic material, (2) providing a flux which, during collective melting with the refractory inorganic material from the precious metal sweeps provided in step (1), is capable of forming a molten slag consisting of >35 to 45 wt % calcium oxide, 35 to 45 wt % silicon dioxide, 15 to <20 wt % aluminum oxide, and 0 to <15 wt % of one or more refractory inorganic compounds other than calcium oxide, silicon dioxide and aluminum oxide, (3) collective melting of the materials provided in steps (1) and (2) at a temperature in the range of from 1300 to 1600° C., forming a melt comprising at least two phases of different densities arranged one above the other, and (4) separating the low-density upper phase and the high-density lower phase, wherein the upper phase comprises or is a slag phase consisting of >35 to 45 wt % calcium oxide, 35 to 45 wt % silicon dioxide, 15 to <20 wt % aluminum oxide, and 0 to <15 wt % of one or more refractory inorganic compounds other than calcium oxide, silicon dioxide and aluminum oxide, and the lower phase comprises or is the collector alloy, wherein none of the materials used in the method comprises copper oxide, except for copper oxide optionally present as an outer copper oxide layer on metallic copper.

In this first embodiment, step (3) can proceed with the addition of pure copper and/or pure silver.

The term "pure copper" used herein refers to metallic copper having a purity of at least 97 wt % and is thus distinct from alloys having a copper content of <97 wt %. The pure copper can have an outer copper oxide layer.

In a second embodiment of the method according to the invention, it is a method for producing pure silver, and the precious metal sweeps are silver sweeps. The method then comprises the steps of:

(1) providing silver sweeps consisting of 4 to 30 wt % silver and 70 to 96 wt % of at least one refractory inorganic material, (2) providing a flux which, during collective melting with the refractory inorganic material from the silver sweeps provided in step (1), is capable of forming a molten slag consisting of >35 to 45 wt % calcium oxide, 35 to 45 wt % silicon dioxide, 15 to <20 wt % aluminum oxide, and 0 to <15 wt % of one or more refractory inorganic compounds other than calcium oxide, silicon dioxide and aluminum oxide, (3) collective melting of the materials provided in steps (1) and (2) at a temperature in the range from 1300 to 1600° C., forming a melt comprising at least two phases of different densities arranged one above the other, and (4) separating the low-density upper phase and the high-density lower phase, wherein the upper phase comprises or is a slag phase consisting of >35 to 45 wt % calcium oxide, 35 to 45 wt % silicon dioxide, 15 to <20 wt % aluminum oxide, and 0 to <15 wt % of one or more refractory inorganic compounds other than calcium oxide, silicon dioxide and aluminum oxide, and the lower phase comprises or is pure silver, wherein none of the materials used in the method comprises copper oxide.

In this second embodiment, step (3) can proceed with the addition of pure silver on its own, i.e. without the addition of metals other than pure silver.

Both embodiments of the method according to the invention comply with the same selection rule as set out in step (2) regarding the flux to be selected.

In the method according to the invention, during step (3) a collector alloy comprising precious metal (first embodiment of the method), or pure silver (second embodiment of the method) is formed.

The collector alloy comprises a total of 25 to 100 wt % precious metal and thereby 0 to <97 wt % of the precious metal silver, 0 to 75 wt % of at least one precious metal selected from the group consisting of gold, platinum, rhodium and palladium, and 0 to 75 wt % of at least one non-precious metal selected from the group consisting of copper, iron, tin and nickel; it can thereby further comprise, for example, up to 5 wt % in total of one or more other elements (elements other than silver, gold, platinum, rhodium, palladium, copper, iron, tin and nickel), such as, for example, lead, zinc and chromium. The collector alloy may accordingly comprise, for example, only precious metal, i.e. either at least two precious metals selected from gold, platinum, rhodium and palladium, or silver together with one or more precious metals selected from gold, platinum, rhodium and palladium; however, it may also comprise at least one of the non-precious metals selected from copper, iron, tin and nickel (i) together with silver or (ii) together with one or more precious metals selected from gold, platinum, rhodium and palladium or (iii) together with silver and one or more precious metals selected from gold, platinum, rhodium and palladium. The collector alloy may also comprise elements other than silver, gold, platinum, rhodium, palladium, copper, iron, tin, and nickel in each of the aforementioned variants (i)-(iii).

In a preferred embodiment, the collector alloy comprises 40 to 100 wt % precious metal in total.

If, in the method according to the invention, a collector alloy is produced according to its first embodiment, any silver content can be derived from the precious metal sweeps and/or from any pure silver optionally added during step (3), any content of gold, platinum, rhodium, palladium, iron, tin and/or nickel can be derived from the precious metal sweeps, and any copper content can be derived from the precious metal sweeps and/or from pure copper optionally added during step (3).

If, in the method according to the invention, pure silver is produced according to its second embodiment, the silver is derived from the silver sweeps and optionally from pure silver added during step (3).

In step (1) of the method according to the invention according to its first embodiment, precious metal sweeps comprising 4 to 30 wt % precious metal in total are provided comprising or consisting of 0 to 30 wt % of the precious metal silver, 0 to 10 wt % of at least one precious metal selected from the group consisting of gold, platinum, rhodium and palladium, 0 to 10 wt % of at least one non-precious metal selected from the group consisting of copper, iron, tin and nickel, and 70 to 96 wt % of at least one refractory inorganic material. The precious metal fraction is substantially (>95%) or completely present as a metal or as a constituent of a metal alloy. Precious metal which is not in metallic form is generally present as an oxide and does not belong to the refractory inorganic material. The precious metal sweeps may further comprise small fractions, for example up to 5 wt % of one or more other elements (elements other than silver, gold, platinum, rhodium, palladium, copper, iron, tin, and nickel), such as, for example, lead, zinc and chromium. If desired, any organic impurities present, such as, for example, organic compounds and/or carbon, may be removed before step (3) is carried out.

Preferably, the precious metal sweeps comprise or consist of 3.5 to 29.5 wt % of the precious metal silver, 0.5 to 10 wt % of at least one precious metal selected from the group consisting of gold, platinum, rhodium and palladium, 0 to 10 wt % of at least one non-precious metal selected from the group consisting of copper, iron, tin and nickel, and 70 to 96 wt % of at least one refractory inorganic material.

With regard to the type and examples of the refractory inorganic material, reference is made to the aforementioned.

In step (1) of the method according to the invention according to its second embodiment, silver sweeps consisting of 4 to 30 wt % silver and 70 to 96 wt % of at least one refractory inorganic material are provided. The silver content is substantially (>95%) or completely present as metal. Silver which is not in metallic form is generally present as silver oxide and does not belong to the refractory inorganic material.

With regard to the type and examples of the refractory inorganic material, reference is also made here to the aforementioned.

In step (2) of the method according to the invention, a flux is provided, which, during collective melting with the refractory inorganic material from the precious metal sweeps or silver sweeps provided in step (1), is capable of forming a molten slag consisting of >35 to 45 wt % calcium oxide, 35 to 45 wt % silicon dioxide, 15 to <20 wt % aluminum oxide, and 0 to <15 wt % of one or more refractory inorganic compounds other than calcium oxide, silicon dioxide and aluminum oxide. Specifically, this means that the flux, together with the refractory inorganic material from the precious metal sweeps or silver sweeps provided in step (1), is capable of forming a molten slag of said composition as an upper melt phase with low density during step (3).

It is easy for the person skilled in the art to select the flux taking into consideration the selection rule disclosed herein. To this end, such a person must merely obtain knowledge of the absolute amount and composition of the precious metal sweeps or silver sweeps, or of the refractory inorganic material comprised by it, which is to be processed by melting metallurgy in a specific batch (a batch of defined size) according to the method of the invention. When the mixture calculation customary in the art is used, it is then possible to select a suitable quantity of a flux having a suitable composition. This is explained in an example: For example, 100 kg of precious metal sweeps having the composition 45.2 wt % aluminum oxide, 5.7 wt % calcium oxide, 37.2 wt % silicon dioxide, 6.6 wt % other oxides in total (titanium oxide, iron oxide and zirconium oxide) and 5.2 wt % precious metals (Ag, Au, Pt) should be processed by means of a melting metallurgy process. Using 163 kg of flux, for example having the composition 100 kg calcium oxide and 63 kg silicon dioxide, a slag composed of 40.9 wt % calcium oxide, 39.0 wt % silicon dioxide, 17.5 wt % aluminum oxide and 2.6 wt % of the other oxides is obtained in the method according to the invention.

The materials provided in steps (1) and (2), i.e. the precious metal sweeps or silver sweeps and/or the flux, can be expediently crushed, for example, ground, prior to the collective melting in step (3). In this case, the person skilled in the art will take good manageability into account and, for example, avoid crushing that leads to dust problems.

In step (3) of the method according to the invention according to its first embodiment, the materials provided in steps (1) and (2), optionally with the addition of pure copper and/or pure silver, are melted together at a temperature in the range of from 1300 to 1600° C. By contrast, in step (3) of the method according to the invention according to its second embodiment, the materials provided in steps (1) and (2), optionally with the addition of pure silver, but under no circumstances with the addition of copper or other metals, are melted together at a temperature in the range of from 1300 to 1600° C. In both embodiments, a melt is formed from two or more phases of different densities arranged one above the other (in the vertical direction). The phases arranged one above the other comprise an upper phase comprising or consisting of the molten slag composed as already mentioned above and a lower phase comprising or consisting of the molten collector alloy composed as already mentioned above (first embodiment of the method according to the invention), or comprising or consisting of pure molten silver (second embodiment of the method according to the invention). In the method according to the invention, preference is given to working so as to produce a ratio of the upper and lower phases, adding up to 100 parts by weight, for example in the range of from 5 to 60 parts by weight, preferably 10 to 50 parts by weight, of the collector alloy or pure silver: 40 to 95 parts by weight, preferably 50 to 90 parts by weight of slag.

If pure copper and/or pure silver or pure silver alone is added during step (3), it will become a constituent of the lower phase that develops.

During step (3), reducing agents, such as propane, but more likely solid reducing agents in the form of coke, graphite and/or plastic (plastic residues, plastic recyclate), may optionally be supplied or added. This can be expedient in particular if the material provided in step (1) comprises precious metal oxide(s) and/or non-precious metal oxides other than copper oxide, such as for example tin oxide. Metal oxides can thus be reduced to the metal and become a constituent of the lower phase.

During the melting process of step (3), the precious metal sweeps or the silver sweeps are separated into their constituents, i.e., into precious metal or silver, any non-precious metal comprised by the sweeps, and the refractory inorganic material.

If a collector alloy is produced in the method according to the invention according to the first embodiment, said collector alloy collects in the lower region of the melting furnace due to the high density in the range of from 10 to 18 g/cm$^3$, for example. The precious metal content of the collector alloy is not necessarily higher but is generally higher than in the precious metal sweeps, and subsequently enables a preparation of the precious metal or precious metals as metal or as a precious metal compound after appropriate processing of the collector alloy.

If, in the method according to the invention, pure silver is produced according to the second embodiment, said pure silver also collects in the lower region of the melting furnace due to its high density.

The refractory inorganic material mixes with the flux provided in step (2), forming said molten slag which accumulates in the upper region of the melting furnace and has a lower density in the region of from 2.5 to 4 g/cm$^3$ density, for example.

In order to avoid misunderstandings, the density specifications given herein refer to the respective solid at 20° C.

As a result, the molten slag floats on the top, and the likewise molten collector alloy or the molten pure silver collects at the bottom, i.e. a liquid system develops comprising at least these two melt phases arranged one above the other.

Substantially, the molten slag is the result of the fusing of the refractory inorganic material from the precious metal sweeps or silver sweeps with the flux provided in step (2). The molten slag can in this case be a chemically unchanged mixture of said substances forming it, or the latter may have undergone a chemical change.

The melting process can be carried out in a customary, for example gas-fired, melting furnace. In an expedient embodiment, it is a rotating and/or tiltable melting furnace, for example a short rotary furnace. In general, work is carried out in a reducing or inert furnace atmosphere.

It is possible for the materials provided in steps (1) and (2) to be mixed then added in portions, or in separate portions, for example in alternate portions, into the hot melting furnace and melted. Any pure copper and/or pure silver or pure silver alone to be added can be added in portions to the melt, for example, during this or thereafter. Adding in portions means that the portion size and addition frequency are guided by the progress of the melting process, and therefore addition to the melt takes place so as to ensure good heat transfer into the melt material.

Essential to the success of step (3) is in particular the correct choice of flux in step (2). The success of step (3) means that, in the course thereof, a slag with only a low precious metal or silver content is formed, in other words that as much of the precious metal comprised by the precious metal sweeps as possible is in the lower collector alloy phase formed during step (3), or as much of the silver comprised by the silver sweeps as possible is in the lower phase of pure silver formed during step (3). The correct choice of flux refers to the type and amount of flux, i.e. the total amount of flux relative to the amount of precious metal sweeps or silver sweeps, and to the composition of the flux per se according to the type and quantity of its constituents. In other words, the consideration of the selection rule that the provision of a flux which, during collective melting with the refractory inorganic material from the precious metal sweeps or silver sweeps provided in step (1), is capable of forming a molten slag consisting of >35 to 45 wt % calcium oxide, 35 to 45 wt % silicon dioxide, 15 to <20 wt % aluminum oxide, and 0 to <15 wt % of one or more refractory inorganic compounds other than calcium oxide, silicon dioxide and aluminum oxide is an essential prerequisite for the success of step (3). It is assumed that such a molten slag at the temperature prevailing during step (3) has a suitably low viscosity for molten precious metal or silver to leave the slag phase in the direction of the melt phase located below. Thus, the viscosity, calculated by means of the FactSage© simulation software, of a slag, composed as mentioned above, in the temperature range prevailing during step (3) is in the range of only 0.1 to 5 Pa·s, for example.

After completion of step (3), i.e. after the two-phase or multi-phase system has been formed, step (4) of the method according to the invention is carried out, namely the separation of the low-density upper phase and the high-density lower phase.

Preferably, the separation of the phases according to step (4) is a separation of the low-density upper phase from the high-density lower phase by exploiting the density difference. For this purpose, the contents of the melting furnace according to the known decanting principle can be carefully poured out, for example, or the slag phase located above or the metal phase located at the bottom is tapped off. The molten collector alloy or the molten pure silver from the lower phase can then cool down and be allowed to solidify, for example within suitable containers.

After cooling and solidification of the collector alloy or of the pure silver, the solidified metal can be collected. Particularly in the case of the collector alloy, the latter can then be subjected to further conventional refining, for example electrometallurgical and/or hydrometallurgical refining, in order ultimately to obtain the precious metal or the individual precious metals either as metal or as a precious metal compound or for example as a solution of the same.

The separation of the phases according to step (4), however, can also take place in such a way that the contents of the furnace, i.e. the two-phase or multiphase melt, are poured out and allowed to cool and solidify without separation measures. Thereafter, a mechanical separation of the solidified phases can take place, followed by a collection of the solidified metal. Particularly in the case of the collector alloy, the latter can then be subjected to further conventional refining, for example electrometallurgical and/or hydrometallurgical refining, in order ultimately to obtain the precious metal or the individual precious metals either as metal or as a precious metal compound or for example as a solution of the same.

EXAMPLES

Example 1

500 kg of precious metal sweeps having the composition according to Table 1 were premixed with 498 kg of calcium oxide and 316 kg of silicon dioxide. This mixture was added to a melting furnace at 1500° C. over a period of 5 hours and melted. Subsequently, 40 kg of copper metal and 2 kg of coke were added, and the melt was kept at this temperature for 60 minutes. The hot slag formed and the collector alloy likewise formed were poured into suitable containers. The chemical composition of the collector alloy and the slag is shown in Table 1.

TABLE 1

|  | Precious metal sweeps | Slag | Collector alloy |
| --- | --- | --- | --- |
| Silver (Ag) | 3.0 wt % | 0.02 wt % | 22.1 wt % |
| Gold (Au) | 1.6 wt % | 0.008 wt % | 11.8 wt % |
| Platinum (Pt) | 0.6 wt % | 0.001 wt % | 4.5 wt % |
| Copper (Cu) | — | 0.19 wt % | 56.2 wt % |
| Iron (Fe) | — | — | 5.4 wt % |
| Aluminum oxide | 45.3 wt % | 17.6 wt % | — |
| Calcium oxide | 5.7 wt % | 40.9 wt % | — |
| Silicon dioxide | 37.2 wt % | 39.1 wt % | — |
| Titanium dioxide | 1.5 wt % | 0.6 wt % | — |
| Iron oxide ($Fe_2O_3$) | 2.4 wt % | 0.5 wt % | — |
| Zirconium oxide ($ZrO_2$) | 2.7 wt % | 1.1 wt % | — |

Example 2

225 kg of silver sweeps having the composition according to Table 2 were premixed with 453 kg of calcium oxide and 465 kg of silicon dioxide. This mixture was added to a melting furnace at 1500° C. over a period of 4 hours and melted. Subsequently, 10 kg of coke were added, and the melt was kept at this temperature for 60 minutes. The hot slag formed and the silver likewise formed were poured into suitable containers. The chemical composition of the slag is shown in Table 2. The silver had a purity of 99.97 wt %.

TABLE 2

|  | Silver sweeps | Slag |
|---|---|---|
| Silver (Ag) | 24.0 wt % | 0.1 wt % |
| Aluminum oxide | 76.0 wt % | 15.6 wt % |
| Calcium oxide | — | 41.6 wt % |
| Silicon dioxide | — | 42.7 wt % |

The invention claimed is:

1. A method for producing a collector alloy comprising 25 to 100 wt % precious metal in total, comprising 0 to <97 wt % of the precious metal silver, 0 to 75 wt % of at least one precious metal selected from the group consisting of gold, platinum, rhodium and palladium, and 0 to 75 wt % of at least one non-precious metal selected from the group consisting of copper, iron, tin and nickel, comprising the steps of:
   (1) providing precious metal sweeps comprising 4 to 30 wt % precious metal in total, comprising 0 to 30 wt % of the precious metal silver, 0 to 10 wt % of at least one precious metal selected from the group consisting of gold, platinum, rhodium and palladium, 0 to 10 wt % of at least one non-precious metal selected from the group consisting of copper, iron, tin and nickel, and 70 to 96 wt % of at least one refractory inorganic material,
   (2) providing a flux which, during collective melting with the refractory inorganic material from the precious metal sweeps provided in step (1), is capable of forming a molten slag consisting of >35 to 45 wt % calcium oxide, 35 to 45 wt % silicon dioxide, 15 to <20 wt % aluminum oxide, and 0 to <15 wt % of one or more refractory inorganic compounds other than calcium oxide, silicon dioxide and aluminum oxide,
   (3) collective melting of the materials provided in steps (1) and (2) at a temperature in the range from 1300 to 1600° C., forming a melt comprising at least two phases of different densities arranged one above the other, and
   (4) separating the low-density upper phase and the high-density lower phase,
   wherein the upper phase comprises a slag phase consisting of >35 to 45 wt % calcium oxide, 35 to 45 wt % silicon dioxide, 15 to <20 wt % aluminum oxide, and 0 to <15 wt % of one or more refractory inorganic compounds other than calcium oxide, silicon dioxide and aluminum oxide, and the lower phase comprises the collector alloy,
   wherein none of the materials used in the method comprises copper oxide, except for copper oxide optionally present as an outer copper oxide layer on metallic copper.

2. A method for producing pure silver, comprising the steps of:
   (1) providing silver sweeps consisting of 4 to 30 wt % silver and 70 to 96 wt % of at least one refractory inorganic material,
   (2) providing a flux which, during collective melting with the refractory inorganic material from the silver sweeps provided in step (1), is capable of forming a molten slag consisting of >35 to 45 wt % calcium oxide, 35 to 45 wt % silicon dioxide, 15 to <20 wt % aluminum oxide, and 0 to <15 wt % of one or more refractory inorganic compounds other than calcium oxide, silicon dioxide and aluminum oxide,
   (3) collective melting of the materials provided in steps (1) and (2) at a temperature in the range of from 1300 to 1600° C., forming a melt comprising at least two phases of different densities arranged one above the other, and
   (4) separating the low-density upper phase and the high-density lower phase,
   wherein the upper phase comprises a slag phase consisting of >35 to 45 wt % calcium oxide, 35 to 45 wt % silicon dioxide, 15 to <20 wt % aluminum oxide, and 0 to <15 wt % of one or more refractory inorganic compounds other than calcium oxide, silicon dioxide and aluminum oxide, and the lower phase comprises pure silver,
   wherein none of the materials used in the method comprises copper oxide.

3. The method according to claim 1, wherein the precious metal sweeps comprise 3.5 to 29.5 wt % of the precious metal silver, 0.5 to 10 wt % of at least one precious metal selected from the group consisting of gold, platinum, rhodium and palladium, 0 to 10 wt % of at least one non-precious metal selected from the group consisting of copper, iron, tin and nickel, and 70 to 96 wt % of at least one refractory inorganic material.

4. The method according to claim 1, wherein the precious metal sweeps and/or the flux are crushed prior to the collective melting in step (3).

5. The method according to claim 2, wherein the silver sweeps and/or the flux are crushed prior to the collective melting in step (3).

6. The method according to claim 1, wherein work is carried out so as to produce a ratio of the upper and lower phases, adding up to 100 parts by weight, in the range of 5 to 60 parts by weight of collector alloy: 40 to 95 parts by weight of slag.

7. The method according to claim 2, wherein work is carried out so as to produce a ratio of the upper and lower phases, adding up to 100 parts by weight, in the range of 5 to 60 parts by weight of silver: 40 to 95 parts by weight of slag.

8. The method according to claim 1, wherein reducing agent is supplied or added during step (3).

9. The method according to claim 1, wherein the melting process takes place in a rotating and/or tiltable melting furnace.

10. The method according to claim 1, wherein step (4) is a separation of said phases from one another by exploiting the density difference.

11. The method according to claim 1, wherein step (4) is conducted in such a way that the two-phase or multiphase melt is poured out and allowed to cool and solidify without separation measures, followed by mechanical separation of the solidified phases.

* * * * *